May 23, 1961 S. O. SAMPSON 2,985,069

AUDIO VISUAL SYNCHRONOUS RECORDER PROJECTOR

Filed Dec. 21, 1959 2 Sheets-Sheet 1

INVENTOR.
SIDNEY O. SAMPSON
BY Zoltan H. Polachek
ATTORNEY

AUDIO VISUAL SYNCHRONOUS RECORDER PROJECTOR

Filed Dec. 21, 1959 2 Sheets-Sheet 2

INVENTOR.
SIDNEY O. SAMPSON
BY
[signature]
ATTORNEY 2,985,069

AUDIO VISUAL SYNCHRONOUS RECORDER PROJECTOR

Sidney O. Sampson, 216 E. 31st St., New York, N.Y.

Filed Dec. 21, 1959, Ser. No. 861,070
1 Claim. (Cl. 88—28)

This invention concerns an audio-visual system for projecting slides in sequence accompanied by appropriate audible subject matter recorded on one track of a magnetic tape, the tape having another track carrying recorded signals for controlling the changing of the slides in the projector.

According to the invention there is provided a sound recording-reproducing apparatus having a track selector which permits audio message signals to be recorded on one track of a magnetic tape and permits audio control signals for the projector to be recorded on a second track of the tape. The apparatus includes playback means for reproducing the audio message signals audibly. Electromechanical means is provided for advancing the slides in the projector in response to emission of an audio control pulse by the reproducing apparatus.

It is therefore one object of the invention to provide a sound recording-reproducing apparatus including magnetic tape as the record medium, the tape having dual audio signal tracks selectively connected by switching means in circuit with a single microphone for recording audio message signals on one track and recording control signals on another track.

A further object is to provide an apparatus of the character described in the foregoing object, operatively connected to a slide projection apparatus adapted to project slides in sequence and to change the slides in succession in response to emission of control pulses by the recording-reproducing apparatus.

Another object is to provide a sound recording-reproducing apparatus having control signals of audio frequency recorded on a control track for controlling operation of a sequential slide projector.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 6 is a front view of a portion of a control panel forming part of the sound recorder-reproducer apparatus.

Figures 1, 2, 3:
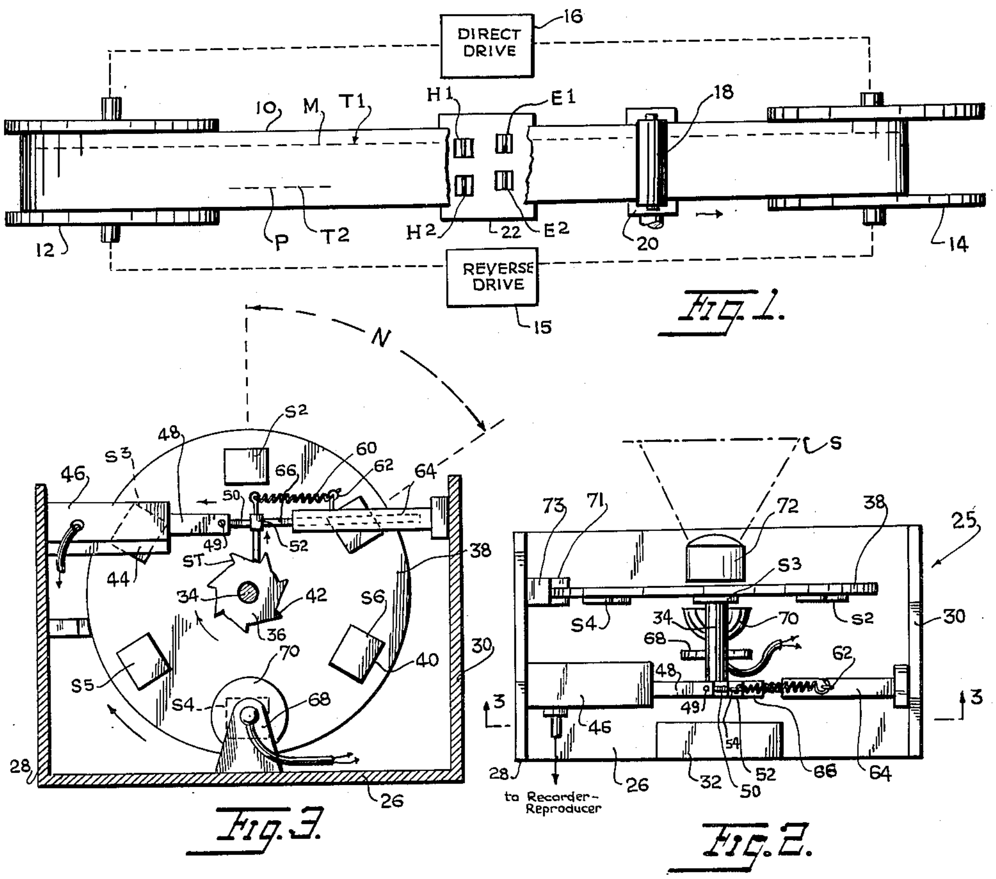
Fig. 1 is an elevational view partially diagramamtic in form of portions of a recorder-reproducer apparatus according to the invention.
Fig. 2 is a top plan view of a slide projector apparatus employed in the system embodying the invention.
Fig. 3 is a vertical sectional view taken on line 3—3 of Fig. 2.

Referring to Fig. 1, there is shown a magnetic tape 10 having two tracks T1 and T2 upon which are respectively recorded message signals M and control signals or pulses P. The message signals are recorded at ordinary audio frequencies and the control signals are recorded at voice frequencies. The message signals M may have any desired length, but the control signals P are preferably short and occur on track T2 at intervals or breaks in the message signals M on track T1. The arrangement of the signals on the tape 10 will be explained in greater detail later in connection with Fig. 5.

The tape 10 is carried on a supply reel 12 at one end and a takeup reel 14 at the other end. A direct drive motor or other means 16 drives the tape from the supply reel to the takeup reel and also drives a capstan 18 cooperating with an idler roller 20 so that the tape moves at uniform speed past a head assembly 22. This head assembly has recording-reproducing heads H1 and H2 for the respective tracks T1 and T2. In addition, erase heads E1 and E2 are associated with the respective heads H1, H2 and tracks T1, T2 for erasing the tracks clean of previously recorded signals prior to new recording of signals on the tracks by heads H1, H2. A reverse drive motor or other means 15 serves to rewind the tape from the supply reel back on to the takeup reel.

The system includes a slide projection apparatus 25 shown in Figs. 2 and 3. This apparatus has a base plate 26 with two upstanding side walls 28, 30. Mounted on the base plate is a bearing block 32 in which is journaled a shaft 34. The shaft carries ratchet wheel 36 and a circular opaque disk 38. The disk has circumferentially spaced openings 40 in which are disposed slides S1–S6. Six slides are shown equally spaced N° apart. More or less than six equally spaced slides may be provided. The ratchet wheel 36 has as many teeth 42 as there are slides. Mounted on wall 28 is a bracket 44 carrying a solenoid 46 connected to the recorder-reproducer as will be explained in connection with Fig. 4. The solenoid has a retractable armature or plunger 48 connected by screws 49 to an arm 50 extending laterally from a sleeve 52 shown in section in Fig. 7. The sleeve has a vertical passage 54 in which is slidable a pawl bar 56 having a lower curved end 58 which normally rests on the periphery of wheel 36. The upper end of bar 56 has an eye 59 in which is engaged one end of a spring 60. The other end of the spring is engaged in the eye of a pin 62 secured to a hollow guide member 64. Member 64 has an axial passage 65 for slidably receiving another arm 66 extending laterally from sleeve 52 in alignment with arm 50. On the base plate 26 is a bracket 68 carrying a projection lamp 70. Slide S4 is shown in projection position in back of the lamp, in Fig. 3. In front of the disk 38 is a lens system 72 disposed to project a picture or other view upon screen S indicated by a dotted line in Fig. 2. The disk 38 is rotatable with shaft 34 to position each of the slides S1—S6 in turn in projection position in front of the lamp 70. A bracket 73 carrying a friction pad 71 is frictionally engaged on the periphery of disk 38 to prevent it from rotating except when it is positively moved clockwise due to actuation of the solenoid.

Figures 4, 5, 7:
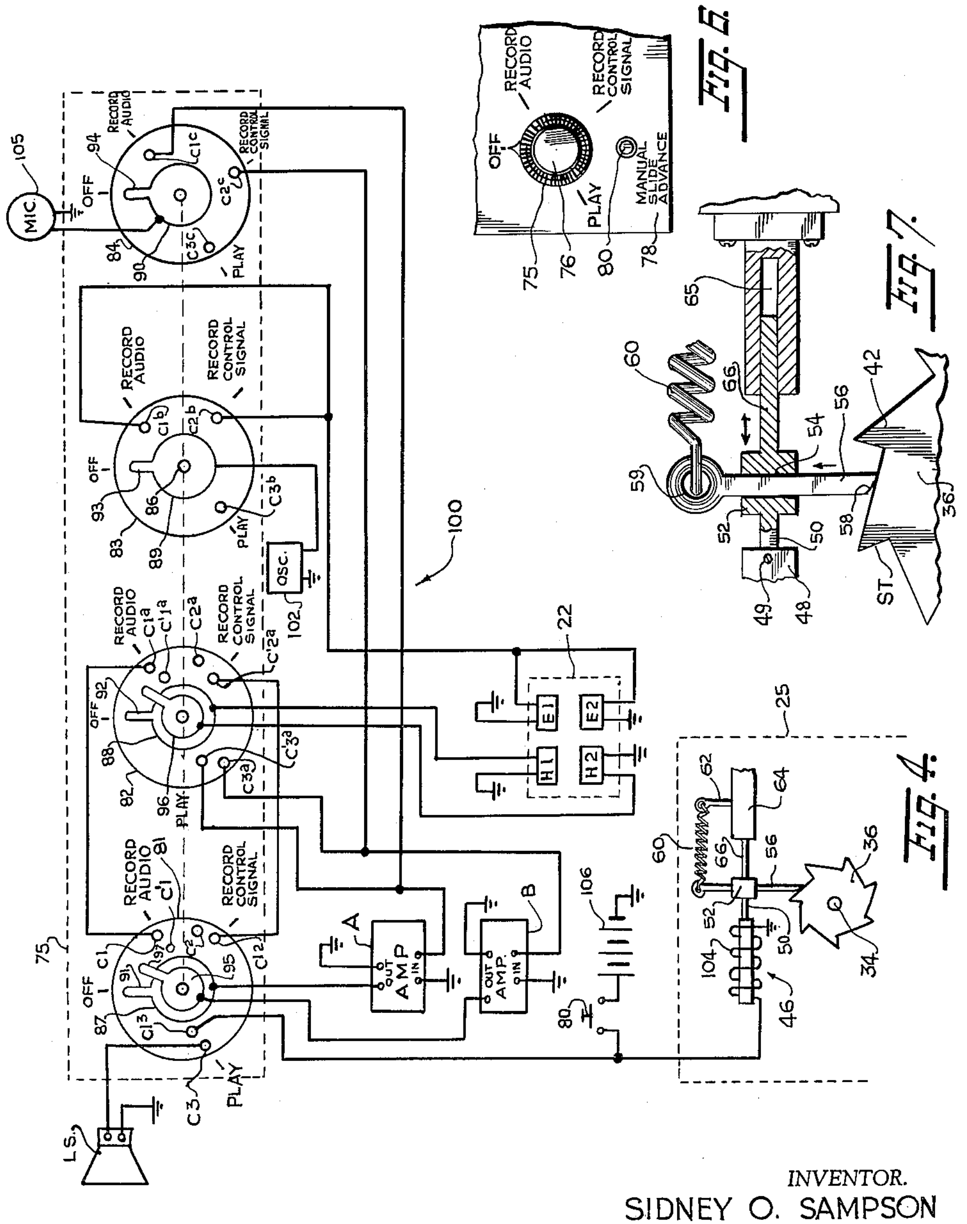
Fig. 4 is a circuit diagram of an electrical circuit employed in the system.
Fig. 7 is a vertical partially sectional view of portions of the slide changing parts of the slide projector, taken on an enlarged scale.

The recorder-reproducer 100, as shown in Fig. 4, includes a selector switch 75. This switch is operable by a knob 76 on a panel 78 shown in Fig. 6. The switch has four positions designated respectively Off, Record Audio, Record Control Signal and Play. A push button 80 is also provided for manually operating the solenoid 46 when required.

Switch 75 has four stationary disks or wafers 81—84. On a common insulated shaft 86 rotated by knob 76 are conductive disks 87—90 having fingers 91—94 extending radially outwardly. Each wafer has three radially spaced fixed contacts only certain ones of which are connected in circuit with other components in the apparatus. Adjacent to but spaced from disks 87 and 88 at wafers 81, 82 are further smaller conductive disks 95, 96 having fingers 97, 98 extending radially for contacting fixed contacts spaced on the wafers but disposed radially inwardly from outer contacts contacted by the outer fingers 91, 92.

The outer contacts on wafer 81 are designated C1—C3. The inner contacts are designated C'1—C'3. The outer contacts on wafer 82 are designated $C1^a$, $C2^a$, $C3^a$ and inner contacts are designated $C'1^a$, $C'2^a$ and $C'3^a$. The contacts on wafer 83 are $C1^b$, $C2^b$, $C3^b$. The contacts on wafer 84 are $C1^c$, $C2^c$, $C3^c$. Contacts C2, C'1, $C2^a$, $C'1^a$, $C3^b$ and $C3^c$ are open circuited. An amplifier A has its output connected to disk 87. Another amplifier B has its output connected to disk 95. The input of the amplifier A is connected to contacts $C'3^a$ and $C1^c$. The input of amplifier B is connected to contacts $C3^a$ and $C2^c$. An oscillator 102 is connected to disk 89. The coil 104 of solenoid 46 is connected to contact C'3. A battery 106 is connected in series with the normally open push button 80 to coil 104. A microphone 105 is connected to disk 90. Loudspeaker LS is connected to contact C3.

Figure 5:
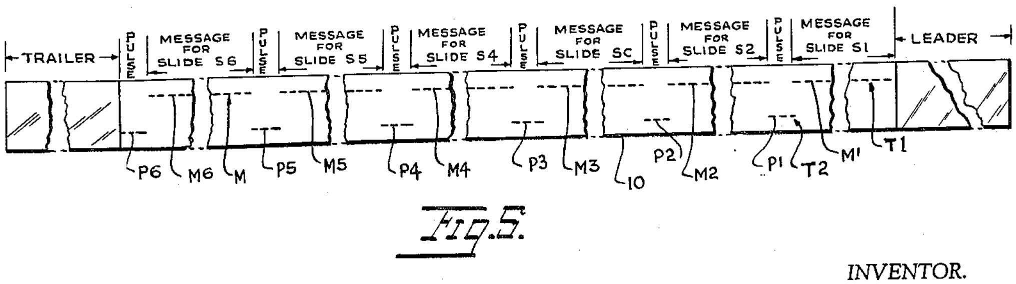
Fig. 5 is a plan view of a dual track tape employed in the system.

Head H1 is connected to disk 88. Head H2 is connected to disk 96. Head E1 is connected in parallel with head E2 to contacts $C1^b$ and $C2^b$. The heads H1 and H2 record and pick up signals from tape 10 while heads E1 and E2 erase the tape prior to recording thereon. The tape 10 is shown in Fig. 5 to which reference is now made.

Tape 10 has a leader 108 and a trailer 110 of any desired length. Message signals M such as voice, music, or otherwise at ordinary audio frequencies are recorded on one track of the tape while control signals P at audio frequencies are recorded on the other track. Six message signals M1—M6 are shown recorded on one track of the tape and six control signals P1—P6 are recorded on the other track at intervals between the several message signals. Signal P6 is recorded after or at the end of message signal M6.

The operation of the system will now be described starting with a fresh tape or a tape containing previously recorded signals mounted on the reels 12 and 14 as indicted in Fig. 1. To record, the switch 75 is set to the Record Audio position placing fingers 91—94 on contacts C1, $C1^a$, $C1^b$ and $C1^c$ respectively. Fingers 97 and 98 are at open circuited contacts C'1 and $C'1^a$. The microphone is now in circuit with the input of amplifier A. The operator can now speak into the microphone while the tape is driven from reel 12 to reel 14 so that the first message M1 is recorded on track T1 of the tape 10 via head H1 now connected to the output of amplifier A via disks 87 and 88. When the message M1 is completed, the operator switches the switch 75 to Record Control Signal position and says a single word such as "one," "slide," etc. This word will be recorded as signal P1 on the tape 10 via amplifier B and head H2. It will be noted that the erase heads E1 and E2 are continuously energized by the oscillator 102 in both recording positions so that the tape's tracks are continuously being erased in advance of the recording. The operator then switches the switch 75 back to Record Audio position and records message M2. He then switches back to the Record Control Signal position and records signal or pulse P2. This switching back and forth is continued until all messages and control pulses are completed. The messages will correspond to the respective slides S1—S6 in succession. The tape will now be recorded in the condition shown in Fig. 5. The tape may now be rewound on to reel 12 to place the beginning of message M1 at head H1.

The switch 75 may now be set to Play position. This will connect the output of amplifier A to loud-speaker LS while the output of amplifier B is connected to coil 104 of solenoid 46. The projection apparatus 25 will have slide S1 at the projection position in front of lamp 70. As the picture on slide S1 is projected upon screen S the message M1 will be reproduced on loud-speaker LS. When the end of message M1 is reached, signal P1 reaches the head H2 and the amplifier B emits an audio frequency pulse which energizes the coil 104 causing the plunger 48 to be retracted. This draws the bar 56 over the adjacent tooth 42 and it falls past step ST on to the periphery of wheel 36. As the plunger 48 is retracted spring 60 is stretched and tensioned. As signal P1 passes head H2, the coil 104 becomes deenergized and spring 60 retracts pulling the bar 56 as a pawl laterally to rotate the wheel 36 and disk 38 clockwise through N° and positioning slide S2 at the projection position. Now message M2 is played through the loud-speaker LS. This continues until signal P2 is reached. The changing of slides occurs at the end of the playing of each message. When message M6 is completed, the disk 38 is rotated to position slide S1 in the initial showing position and the system is ready for another cycle of playing.

This system can be used for advertising purposes to display a plurality of slides in succession and to explain the views of each slide audibly by appropriate comment lasting a predetermined time. The slides will be changed automatically. The system will operate continuously without interruption until turned off. Other uses of the system are for recording and playing back highlights of weddings, sports and public events and the like.

No particular skill is required to operate the system either for recording the signals on tape 10 or in playing back the audio signals. The playback of the audio and control signals will occur automatically. It will be noted that the control signals are recorded by a single sound or spoken word. The movement of the disk 38 carrying the slides occurs as soon as the reproduction of the control signal ceases due to deenergization of the solenoid.

The system can make use of a conventional stereo recording magnetic tape recording apparatus modified to include the circuit of Fig. 4. Other pulse operated slide projection apparatus can be used in association with the apparatus 100.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

In an audio-visual system, a slide projection apparatus including a rotatable disk carrying a plurality of slides circumferentially spaced thereon and exposable in succession at a projection position, a central shaft carrying said disk, a ratchet wheel on said shaft, a solenoid controlled pawl engageable with said ratchet wheel for turning the disk and advancing said slides in turn to said projection position, and a sound producing apparatus for producing different audible messages to accompany the showing of each of the slides in turn, said sound recording-reproducing apparatus further producing control signals for energizing said solenoid to advance the slides in turn at the end of each of said messages, said sound recording-reproducing apparatus including a dual track tape, two magnetic heads associated with the respective tracks, two amplifiers connected by multiple position switch means in circuit with said heads respectively, a loudspeaker in circuit via said switch means with one of the amplifiers for rendering said messages audible in a playing position of said switch means, said solenoid being connected in circuit via said switch means with the other of said amplifiers for energization by said control signals to actuate said solenoid and pawl to turn said disk in said playing position of the switch means, said sound recording-reproducing apparatus further including a microphone, said switch means having two recording positions, said microphone and one of said heads being connected to one of said amplifiers via said switch means in one recording position thereof for recording said message signals on said one track, said microphone and the other of said heads being connected to the other of said amplifiers via said switch means in the other recording position thereof for recording said control signals on the other of said tracks, erase heads associated with the respective tracks, and an oscillator in circuit with said switch means for energizing said erase heads to erase previously recorded signals from said tracks in advance of recording new message and control signals thereon by the first-named heads in both recording positions of said switch means.

References Cited in the file of this patent

UNITED STATES PATENTS

| | | |
|---|---|---|
| 946,500 | Ferguson | Jan. 11, 1910 |
| 2,250,297 | Ditty et al. | July 22, 1941 |
| 2,503,083 | Waller | Apr. 4, 1950 |
| 2,606,476 | Waller et al. | Aug. 12, 1952 |
| 2,613,574 | Moss | Oct. 14, 1952 |
| 2,631,855 | Koreni | Mar. 17, 1953 |
| 2,811,588 | Julie | Oct. 29, 1957 |
| 2,908,771 | Gallina | Oct. 13, 1959 |